(12) United States Patent
Kitano et al.

(10) Patent No.: US 7,779,958 B2
(45) Date of Patent: Aug. 24, 2010

(54) HYDRAULIC PRESSURIZER SYSTEM

(75) Inventors: Kazuhiko Kitano, Saitama (JP);
Osahide Miyamoto, Saitama (JP);
Tomohisa Kaneda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1302 days.

(21) Appl. No.: 11/289,518

(22) Filed: Nov. 30, 2005

(65) Prior Publication Data
US 2006/0120888 A1    Jun. 8, 2006

(30) Foreign Application Priority Data
Dec. 2, 2004   (JP) .............................. 2004-349645

(51) Int. Cl.
*F16H 57/04* (2010.01)
(52) U.S. Cl. ...................... 180/339; 180/338
(58) Field of Classification Search ............... 180/338, 180/339; 475/136, 137; 417/213, 212, 216
See application file for complete search history.

(56) References Cited

U.S. PATENT DOCUMENTS

| | | | | | |
|---|---|---|---|---|---|
| 5,448,478 | A | * | 9/1995 | Eto | 701/69 |
| 6,336,888 | B1 | * | 1/2002 | Eguchi | 477/3 |
| 6,482,127 | B2 | * | 11/2002 | Katou | 477/192 |
| 6,565,473 | B2 | * | 5/2003 | Endo et al. | 475/117 |
| 6,709,362 | B2 | * | 3/2004 | Tomohiro et al. | 477/3 |
| 7,041,030 | B2 | * | 5/2006 | Kuroda et al. | 477/21 |
| 7,497,800 | B2 | * | 3/2009 | Sakata et al. | 475/136 |
| 2002/0166532 | A1 | * | 11/2002 | Mori et al. | 123/179.31 |
| 2004/0029677 | A1 | * | 2/2004 | Mori et al. | 477/3 |
| 2004/0038774 | A1 | * | 2/2004 | Kuroda et al. | 477/3 |
| 2004/0063539 | A1 | * | 4/2004 | Endo et al. | 477/45 |

FOREIGN PATENT DOCUMENTS

| | | |
|---|---|---|
| JP | 2000-356148 | 12/2000 |
| JP | 2001-041067 | 2/2001 |
| JP | 2001-182814 | 7/2001 |
| JP | 2001-200920 | 7/2001 |
| JP | 2003-009581 | 1/2003 |
| JP | 2003-307271 | 10/2003 |
| JP | 2003-314440 | 11/2003 |
| JP | 2006-161838 | 6/2006 |

\* cited by examiner

*Primary Examiner*—Paul N Dickson
*Assistant Examiner*—Vaughn T Coolman
(74) *Attorney, Agent, or Firm*—Westerman, Hattori, Daniels & Adrian, LLP

(57) ABSTRACT

A hydraulic pressurizer system (30) comprises a drive source (an engine 2 and a motor generator 4), which drives a hybrid vehicle (1), a mechanical oil pump (20), which is driven by the drive source, an electrical motor (22), which is activated by a 12V battery (24), an electrical oil pump (21), which is driven by the electrical motor (22), and a control unit (15), which activates the electrical motor (22). The pressurizer further comprises a ratio-change mechanism (7), which is activated by hydraulic oil supplied by the mechanical oil pump (20) and by the electrical oil pump (21) to establish a speed change ratio, at which the rotational driving force of the drive source is transmitted to wheels (8) with a rotational speed change. For executing a control for stopping the drive source, the control unit (15) executes a cleaning operation, which operates the electrical oil pump (21) for a predetermined time before the stopping of the drive source.

8 Claims, 5 Drawing Sheets

HYDRAULIC PRESSURIZER SYSTEM

FIELD OF THE INVENTION

The present invention relates to a hydraulic pressurizer system, which is used, for example, in a hybrid vehicle and which supplies hydraulic oil to the ratio-change mechanism and the like by an electrically driven oil pump while the engine is not in operation.

BACKGROUND OF THE INVENTION

A hybrid vehicle is driven by a drive source that is a combination of an engine and a motor capable of electricity generation (motor generator), and such a vehicle has been developed for improving fuel efficiency and for reducing exhaust gas in environmental protection. Typically, a hybrid vehicle is controlled for stopping the engine when the vehicle stops in so-called idling-elimination. In this case, when the engine stops, the mechanically driven oil pump, which has been in operation for supplying hydraulic oil, for example, to the ratio-change mechanism, also stops. Therefore, for complementarity, an electrically driven oil pump or electrical oil pump is provided to supply hydraulic oil only while the engine is not in operation under the idling-elimination control, the electrical oil pump being driven by an electrical motor, which receives electric power from the battery (refer to, for example, Japanese Laid-Open Patent Publication No. 2003-307271).

The electrical oil pump operates only while the engine is not in operation in idling-elimination control. If air enters the hydraulic circuit as bubbles while the engine is operating, i.e., while the electrical oil pump is not operating, then when the electrical oil pump is restarted, it may suck up the bubbles and skid momentarily, resulting in a delay in the rise of the hydraulic pressure applied by the electrical oil pump.

SUMMARY OF THE INVENTION

It is an object of the present invention to provide a hydraulic pressurizer system, which never experiences such a momentary skidding.

A hydraulic pressurizer system according to the present invention comprises a drive source (for example, the engine 2 and the motor generator 4 described in the following embodiment) for driving a vehicle, a mechanical oil pump, which is driven by the drive source, an electrical motor, which is activated by a battery (for example, the 12V battery 24 described in the following embodiment), an electrical oil pump, which is driven by the electrical motor, a ratio-change mechanism (for example, the automatic ratio-change mechanism 7 described in the following embodiment), and a control unit, which activates the electrical motor. The ratio-change mechanism is actuated by means of hydraulic oil being supplied from the mechanical oil pump and from the electrical oil pump for establishing a speed change ratio, at which the rotational driving force from the drive source is transmitted to wheels with a rotational speed change. In the hydraulic pressurizer system, the control unit executes a cleaning operation, in which the electrical oil pump is operated for a predetermined period of time, before stopping the drive source in executing a control for stopping the drive source.

In the hydraulic pressurizer system, preferably, the cleaning operation is realized by a program installed on the control unit, and the period of time for which the cleaning operation is executed is a short period of time, which is administered by a timer of the program. In particular, it is preferable that the period of time for which the cleaning operation is executed be equal to or shorter than the period of the rotation of the electrical motor.

In the hydraulic pressurizer system, it is preferable that the electrical motor comprise a three-phase brush-less sensor-less motor.

In addition, it is preferable that the hydraulic pressurizer system further comprise an oil passage (for example, the fifth oil passage 37 described in the following embodiment) that connects between the outlet side and the inlet side of the electrical oil pump, and a relief valve, which is provided on this oil passage and is released to open when the hydraulic pressure of the outlet side becomes equal to or higher than a predetermined value.

In this case, it is preferable that the hydraulic pressure at which the relief valve is released open be set lower than the hydraulic pressure at which the electrical oil pump supplies hydraulic oil to the ratio-change mechanism.

With the hydraulic pressurizer system, which is constructed according to the present invention, even if air bubbles, which have been generated, exist in the hydraulic circuit, air bubbles are agitated and dispersed by the cleaning operation of the electrical oil pump. Therefore, a required pressure is achieved promptly without a delay in the rise of the hydraulic pressure by the electrical oil pump.

This cleaning operation is executed specifically before the execution of the control for stopping the drive source (engine). As a result, the hydraulic pressure applied by the electrical oil pump is elevated promptly to a sufficient level before the hydraulic pressure by the mechanical oil pump decreases. Therefore, it is possible to supply the required hydraulic pressure to the ratio-change mechanism continuously when the source of the hydraulic pressure is switched from the mechanical oil pump to the electrical oil pump.

The cleaning operation is realized by a program installed on the control unit, and the time period for which the cleaning operation is being executed is a short period of time, which is administered by a timer of the program. This time period is set equal to or shorter than the time that the electrical motor takes for one rotation, so the cleaning operation never affects the idling-elimination control.

The hydraulic pressurizer system according to the present invention, whose electrical motor is a three-phase brush-less sensor-less motor, is energy-efficient and is manufactured cost-effectively.

Furthermore, by the provision of the recirculation circuit, which comprises an oil passage that connects the outlet side and the inlet side of the electrical oil pump and a relief valve, as hydraulic oil discharged from the electrical oil pump circulates through the recirculation circuit, air bubbles are agitated and dispersed effectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 3A shows changes in the vehicle speed and in the rotational speed of the engine; FIG. 3B shows whether the condition for stopping the engine for idling-elimination is satisfied or not; FIG. 3C shows whether the electrical oil pump is in operation or not; and FIG. 3D shows the pressure of the hydraulic oil discharged from the electrical oil pump.

DESCRIPTION OF THE PREFERRED EMBODIMENTS

Figure 1:
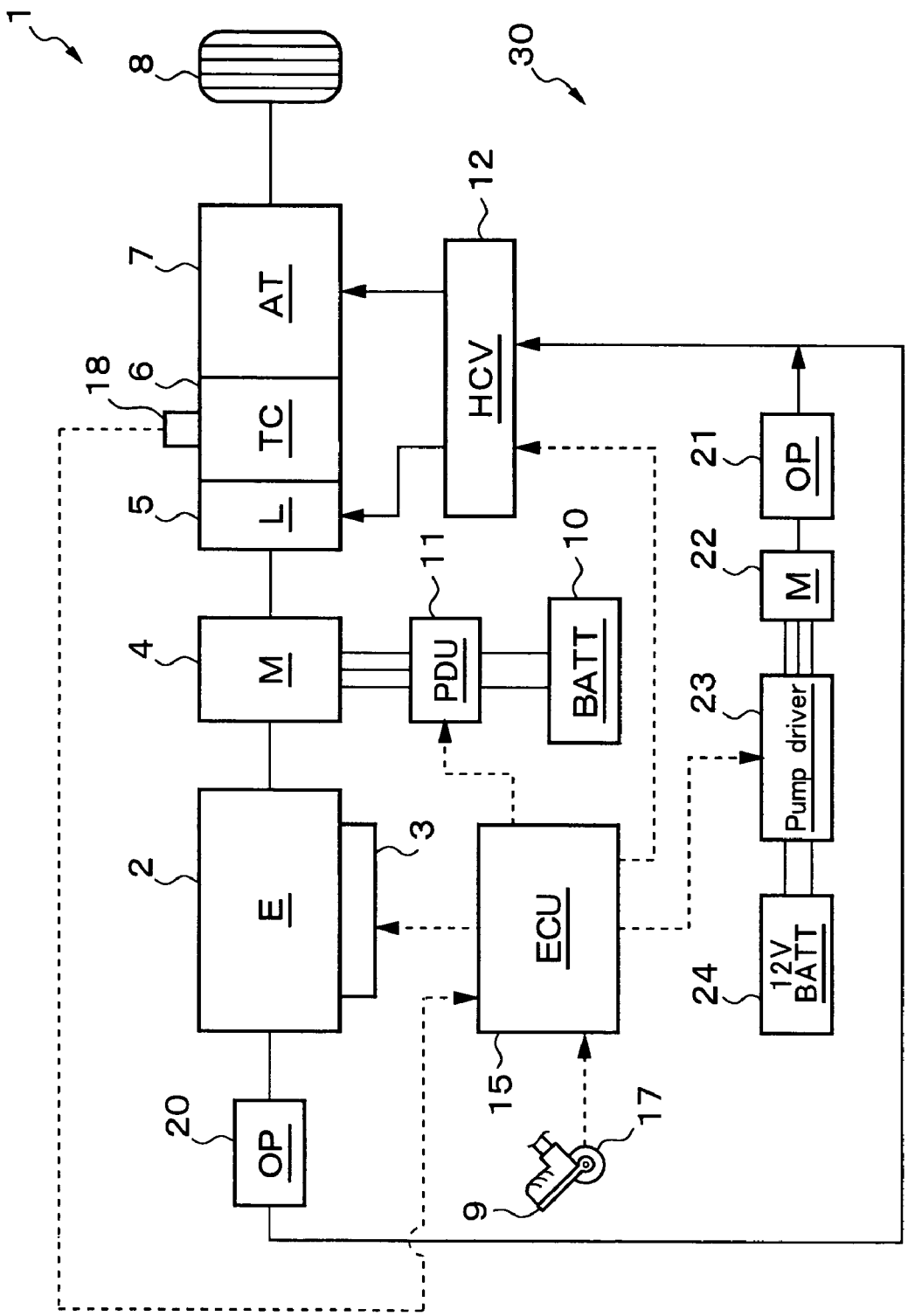
FIG. 1 is a block diagram describing the construction of the drive system of a hybrid vehicle, which is equipped with a hydraulic pressurizer system according to the present invention.

Now, preferred embodiments according to the present invention are described in reference to the drawings. At first, the construction of the drive system of a hybrid vehicle, which is equipped with a hydraulic pressurizer system according to the present invention, is described in reference to FIG. 1.

This hybrid vehicle 1 comprises an engine 2 and an electricity-generating motor (referred to as motor generator) 4 as drive sources, which are connected in series. The vehicle also comprises a torque converter 6, which is connected to the drive sources and equipped with a lock-up clutch 5, and an automatic ratio-change mechanism 7, whose output shaft is connected to drive wheels 8. In this arrangement, the driving force applied alternatively from the engine 2 or the motor generator 4 or simultaneously from these two is transmitted through the torque converter 6 with the lock-up clutch 5 and the automatic ratio-change mechanism 7 to the wheels 8, driving the hybrid vehicle 1, with rotational speed changes being effected by the torque converter 6 and the automatic ratio-change mechanism 7.

In addition, the driving force from the wheels 8 during the deceleration (coasting) of the vehicle, after the accelerator pedal 9 is released from its stepped down position, is transmitted through the automatic ratio-change mechanism 7 and the torque converter 6 with the lock-up clutch 5 to the drive sources. In this case, an engine brake action (braking action by the friction torque of the engine) is effected by the engine 2, and the motor generator 4 is driven by the driving force for electricity generation (energy regeneration).

The engine 2 is a multi-cylinder reciprocating engine, and it is equipped with a controller 3 for engine operation. The controller 3 controls the fuel injection to and the ignition of each cylinder. In addition, it also controls the operation of the suction and exhaust valves of each cylinder and can close the valves of each cylinder for turning the respective cylinders off. The controller 3, which itself is under the control of a control unit 15 described later, executes the automatic start and stop of the engine 2 (so-called, idling-elimination control) and executes a cylinder-off control, which closes the suction and exhaust valves of some or all of the cylinders.

The input member and the output member (the pump member and the turbine member) of the torque converter 6 are engaged or disengaged with each other by the lock-up clutch 5. In the condition where the lock-up clutch 5 is released, the rotational driving force is transmitted between the drive sources (the engine 2 and the motor generator 4) and the automatic ratio-change mechanism 7 through the torque converter 6. On the other hand, if the lock-up clutch 5 is engaged, then the torque converter 6 is bypassed, and the drive sources (the output shaft of the motor generator 4) are connected directly to the input shaft of the automatic ratio-change mechanism 7. The lock-up clutch 5 is actuated for engagement and disengagement by a hydraulic control valve 12, whose operation is controlled by the control unit 15. In other words, the lock-up clutch 5 is controlled for engagement and disengagement by the control unit 15.

The automatic ratio-change mechanism 7 is a ratio-change mechanism that has a plurality of gear trains, of which one desirable train is automatically set in correspondence to the driving condition of the vehicle. This automatic shifting is controlled by a hydraulically actuated shift clutch, whose hydraulic pressure is supplied through the hydraulic control valve 12, which is controlled by the control unit 15. In other words, the automatic shift control is executed by the control unit 15 in correspondence to the driving condition of the vehicle.

The motor generator 4 is driven by the electrical power being supplied from a battery 10 through a power drive unit (PDU) 11, which is controlled by the control unit 15. In other words, the operation of the motor generator 4 is controlled by the control unit 15. In addition, the motor generator 4 is driven by the driving force received from the wheels 8 when the hybrid vehicle 1 is in deceleration. In this case, the motor generator 4 functions as an electric generator that generates energy and also a braking force. As a result, the motor generator 4 converts energy from the kinetic energy of the vehicle to electrical energy, which is recovered through the power drive unit 11 to charge the battery 10. This energy regeneration is also controlled by the control unit 15 through the power drive unit 11.

By the way, in the hybrid vehicle 1, the hydraulic pressure source (hydraulic pressurizer system 30) for the lock-up clutch 5 and the automatic ratio-change mechanism 7 comprises a mechanically driven oil pump 20 and an electrically driven oil pump 21. The mechanical oil pump 20 is connected to the drive sources (to the engine 2 and the motor generator 4) and is driven by the driving force from the drive sources. In FIG. 1, the mechanical oil pump 20 is shown beside the engine 2 for simplifying the description, but, it is actually positioned between the torque converter 6 and the automatic ratio-change mechanism 7.

On the other hand, the electrical oil pump 21 is driven by an electrical motor 22, which is, in turn, operated by a pump driver 23. The pump driver 23, which itself is controlled by the control unit 15, controls the electrical power being supplied from a 12V battery 24 to the motor 22. As mentioned above, when the mechanical oil pump 20 stops applying the hydraulic pressure because the engine 2 has stopped under the idling-elimination control executed by the control unit 15, the electrical motor 22 is operated through the pump driver 23 by the control unit 15 for driving the electrical oil pump 21, which supplies hydraulic oil. The electrical motor 22 comprises a three-phase sensor-less brush-less motor, which is more efficient than a direct-current brush motor and is simpler in construction and cheaper than a brush-less sensor motor.

For the control unit 15 to control the operation of the engine-operation controller 3, the hydraulic control valve 12, the power drive unit 11, and the pump driver 23 as described above, the control unit 15 receives various detection signals, for example, as shown in the drawing, a detection signal from an accelerator sensor 17, which detects the stepping on the accelerator pedal 9, and a detection signal from a rotation sensor 18, which detects the input and output rotational speeds of the torque converter 6. In addition, it receives a detection signal from a vehicle speed sensor for the vehicle speed, a detection signal from an engine rotation sensor for the rotational speed of the engine, a detection signal for the shift position of the transmission, a detection signal from a brake sensor for the brake actuation, and a detection signal for the remaining charge of the battery 10, though they are not illustrated in the drawing.

Figure 2:
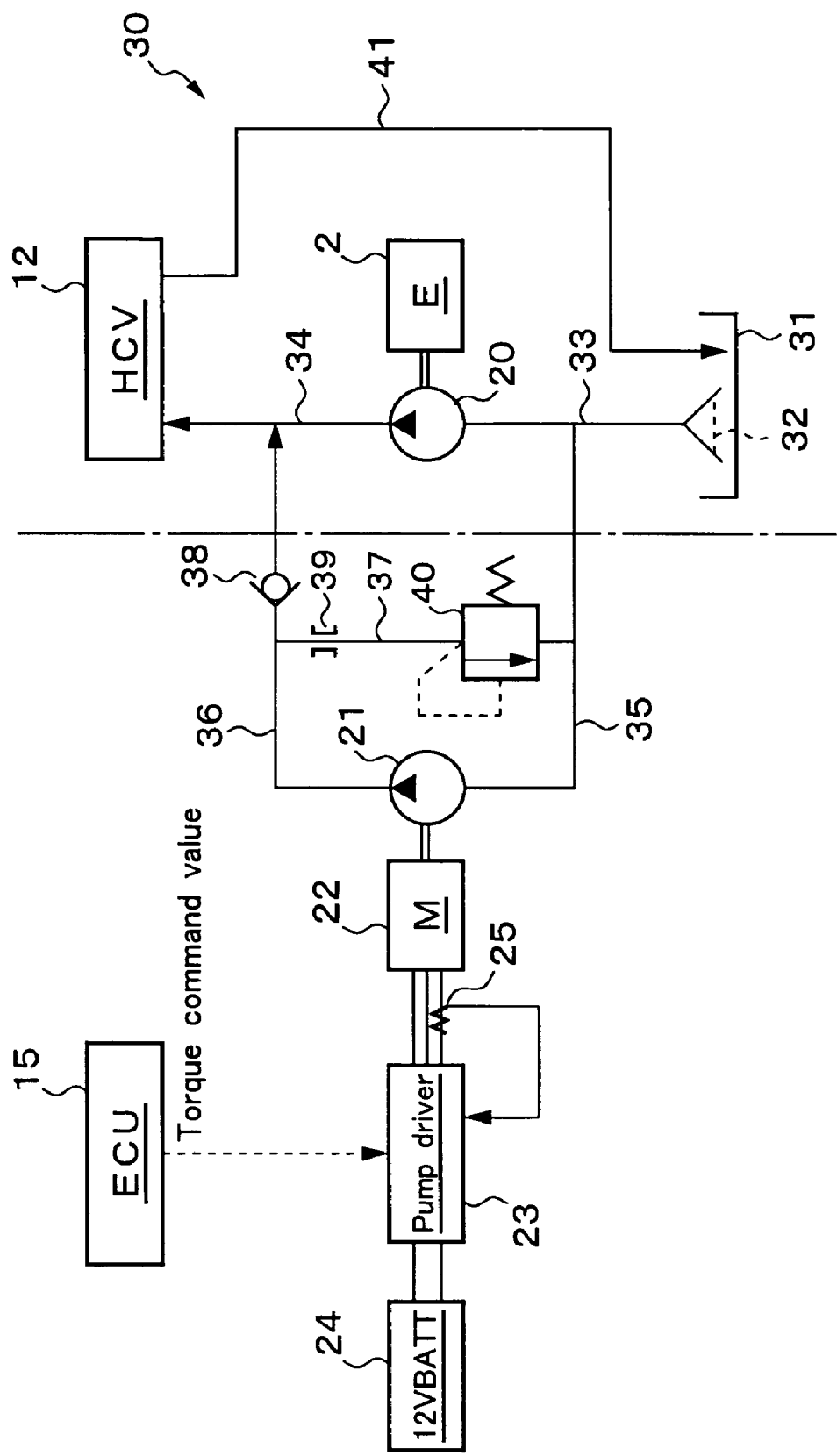
FIG. 2 is a block diagram describing the construction of the hydraulic pressurizer system.

Now, the hydraulic pressurizer system 30 is described in detail in reference to FIG. 2. The hydraulic pressurizer system 30, which includes an oil pan 31 and a strainer 32, has a circuit that comprises a first oil passage 33, which connects between the strainer 32 and the inlet port of the mechanical oil pump 20, a second oil passage 34, which connects between the outlet port of the mechanical oil pump 20 and the hydraulic control valve 12, a third oil passage 35, which branches from the first oil passage 33 and connects to the inlet port of the electrical oil pump 21, a fourth oil passage 36, which connects from the outlet port of the electrical oil pump 21 to the second oil passage 34, and a fifth oil passage 37, which connects between the third oil passage 35 and the fourth oil passage 36. On the fourth oil passage 36, provided is a check valve 38, which prevents oil coming out of the mechanical oil pump 20 from flowing into the electrical oil pump 21. Also, on the fifth oil passage 37, provided are an orifice 39 and a relief valve 40, which are arranged in this order away from the fourth oil passage 36. The relief valve 40 releases oil from the fourth oil passage 36 to the third oil passage 35 when the pressure in the fourth oil passage 36 rises above a predetermined value. In the following description, the line through which oil discharged from the electrical oil pump 21 is led through the fifth oil passage 37 (with the orifice 39 and the relief valve 40) and returned to the oil pump 21 is referred to as "recirculation circuit".

While the oil pump 20 which is mechanically driven by the engine 2 is operating, oil in the oil pan 31 is sucked from the strainer 32 through the first oil passage 33 into the mechanical oil pump 20, where the oil is pressurized and discharged through the second oil passage 34 to the hydraulic control valve 12. On the other hand, when the engine 2 stops, with the hydraulic pressure from the mechanical oil pump 20 becoming ineffective, the electrical oil pump 21 is actuated by the control unit 15. As a result, oil in the oil pan 31 is sucked from the strainer 32 through the first oil passage 33 and through the third oil passage 35 into the electrical oil pump 21, where the oil is pressurized and discharged through the fourth oil passage 36 to the hydraulic control valve 12.

With this arrangement, even while the engine 2 is not operating under the idling-elimination control, the hydraulic pressure necessary is provided by the electrical oil pump 21. This provision can solve the above mentioned problem of a delay in the rise of the hydraulic pressure at the time of the restarting of the engine 2 and thereby prevent a delay in the response for restarting the vehicle. By the way, the hydraulic oil supplied through the hydraulic control valve 12 to the lock-up clutch 5 and the automatic ratio-change mechanism 7 is returned through a sixth oil passage 41 to the oil pan 31.

In this embodiment, the electrical motor 22, which drives the electrical oil pump 21, comprises a brush-less sensor-less motor, whose rotor has permanent magnets and is surrounded by stator coils. The rotational speed of the motor is controlled by adjusting the pulse voltage being applied to the stator coils by the pump driver 23, and the pulse voltage is controlled by a method of pulse width modulation (PWM), which adjusts the pulse width.

In such a brush-less motor, it is necessary to control the pulse voltage, which is applied to the stator coils, in correspondence to the positions of the permanent magnets of the rotor. Therefore, the operation of the pump driver 23 includes a positioning and synchronizing mode, in which the electrical power supplied to the electrical motor 22 is cut off momentarily to let the electrical motor 22 run freely and generate electricity as a synchronous generator by the internal permanent magnets, and the rotational position of the rotor is determined from the voltage output from the electrical motor 22. In this way, the electrical motor 22 is operated precisely by controlling the pulse voltage (this operational mode is referred to as "sensor-less mode").

The electrical oil pump 21, which is mounted in the hybrid vehicle 1, is to maintain the function of the ratio-change mechanism 7 during the stoppage of the engine 2 under the idling-elimination control, whose purpose is to improve fuel economy. Therefore, the electrical oil pump 21 should be operated in a power-saving mode, so it is desirable to control the electrical motor 22 to provide a pump-driving torque that is hardly affected by the temperature and viscosity of the oil. To achieve this, the control unit 15 outputs to the pump driver 23 a torque command value that indicates the value of the torque to be output by the electrical motor 22.

There is a proportional relation between the value of the torque output from the electrical motor 22 (or the pump-driving torque) and that of the electric current flowing through the stator coils (this is referred to as "coil-operating current"). Therefore, for controlling the electrical motor 22, in response to the torque command value received from the control unit 15, the pump driver 23 measures the value of the coil-operating current by a current sensor 25 and controls the current to bring the measured value to a predetermined value or predetermined torque (this control is referred to as "torque control"). On the other hand, if the voltage value being applied to the electrical motor 22 were used for the precise control of the electrical motor 22, then the system would become more complicated because the method based on the voltage is likely to be affected from changes in the source voltage being applied and from fluctuations in the resistance of the harness.

With the above described arrangement, the control unit 15 executes an idling elimination control, which terminates the operation of the engine 2 on the basis of the information detected by various sensors (for example, the accelerator sensor 17 and the rotation sensor 18). For making the engine stop idling, the following conditions (stop-idling conditions) are determined: the operational condition of the automatic ratio-change mechanism 7 is normal; the function of the starting system is normal; the transmission is at a shift position where the stopping of the engine idling is allowed; the charge of the battery 10 is sufficient; the accelerator pedal 9 is turned off; the brake pedal is pressed down; and so on.

Figure 3:
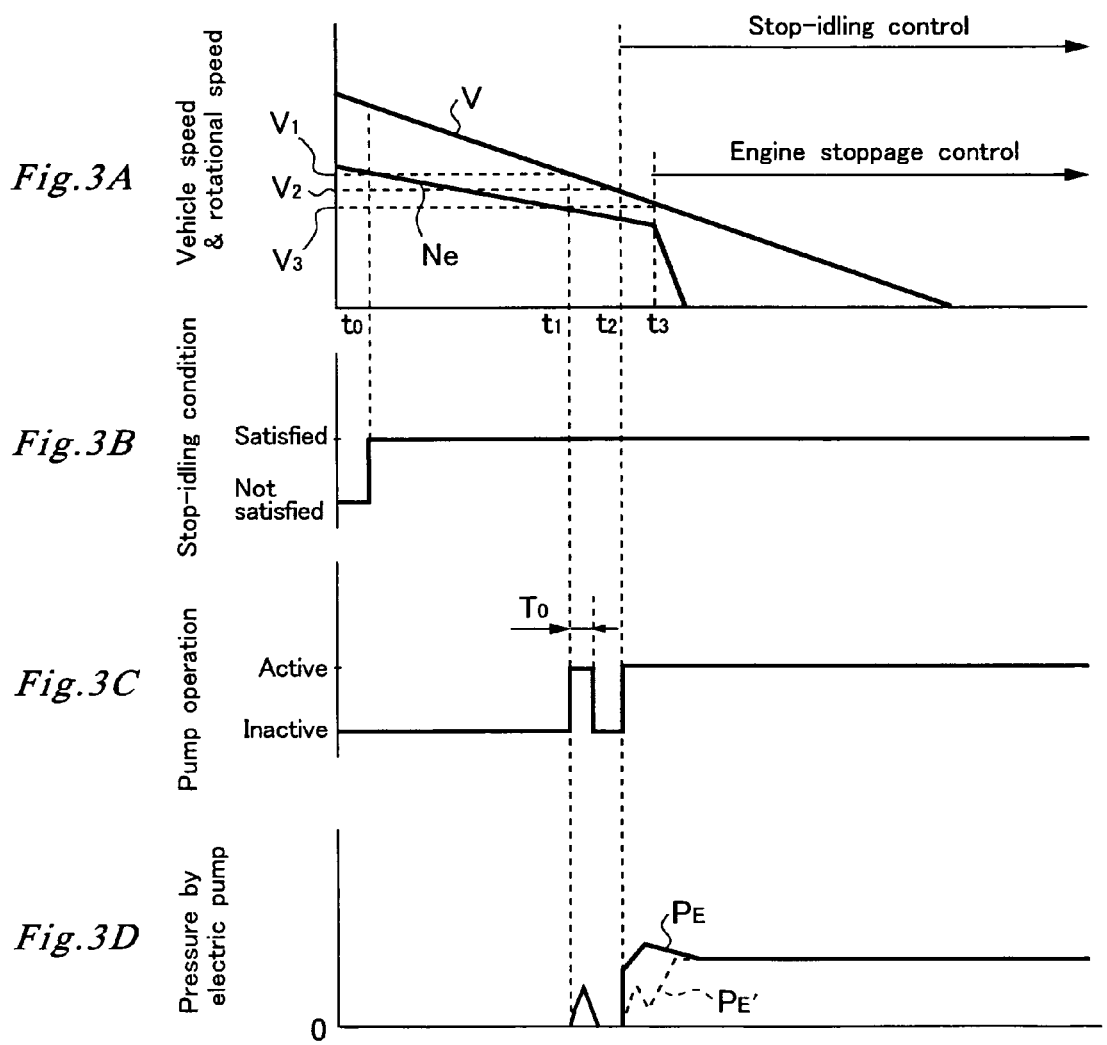
FIGS. 3A-3D are graphs showing chronological changes in the conditions of the hybrid vehicle while it is under an idling elimination control.

As shown in FIG. 3, when the stop-idling conditions are satisfied in the operational condition of the hybrid vehicle 1 at time $t_0$, the control unit 15 executes a stop-idling control in correspondence to the speed V of the vehicle. Specifically, the control unit 15 starts the operation of the electrical oil pump 21 when the vehicle speed reaches vehicle speed $V_2$ at time $t_2$, and it stops the engine 2 when the vehicle speed reaches vehicle speed $V_3$ at time $t_3$. In this arrangement, the electrical oil pump 21 starts operating before the engine 2 stops. As a result, the required hydraulic pressure is provided by the electrical oil pump 21 before the hydraulic pressure that has been applied by the mechanical oil pump 20 declines to cease in correspondence to the decrease in the rotational speed Ne of the engine. When the hydraulic pressure that has been applied by the mechanical oil pump 20 becomes lower than the pressure by the electrical oil pump 21, the check valve 38 opens to let the oil from the electrical oil pump 21 flow into the hydraulic control valve 12.

However, since this pump 21 is operated only during the stoppage of the engine 2 under the idling elimination control as described above, air bubbles can develop in the oil in the hydraulic circuit while the electrical oil pump 21 is not in operation. If the electrical oil pump 21 is brought into operation while such bubbles exist in the hydraulic circuit, then the electrical oil pump 21 can suck bubbles and thereby skid momentarily. During this momentary skidding, the hydraulic pressure applied by the electrical oil pump 21 decreases (refer to pressure $P_E'$ in FIG. 3D) resulting in a delay in the application of the hydraulic pressure to the hydraulic control valve 12.

To solve this problem, the control unit 15 according to the present invention operates the electrical oil pump 21 for a predetermined short time period $T_0$ when the vehicle speed is at vehicle speed $V_1$ (at time $t_1$ in FIG. 3), which is higher than vehicle speed $V_2$, at which the electrical oil pump 21 is brought into standard operation (this prior momentary operation of the electrical oil pump 21 is hereinafter referred to as "cleaning operation").

Figure 4:
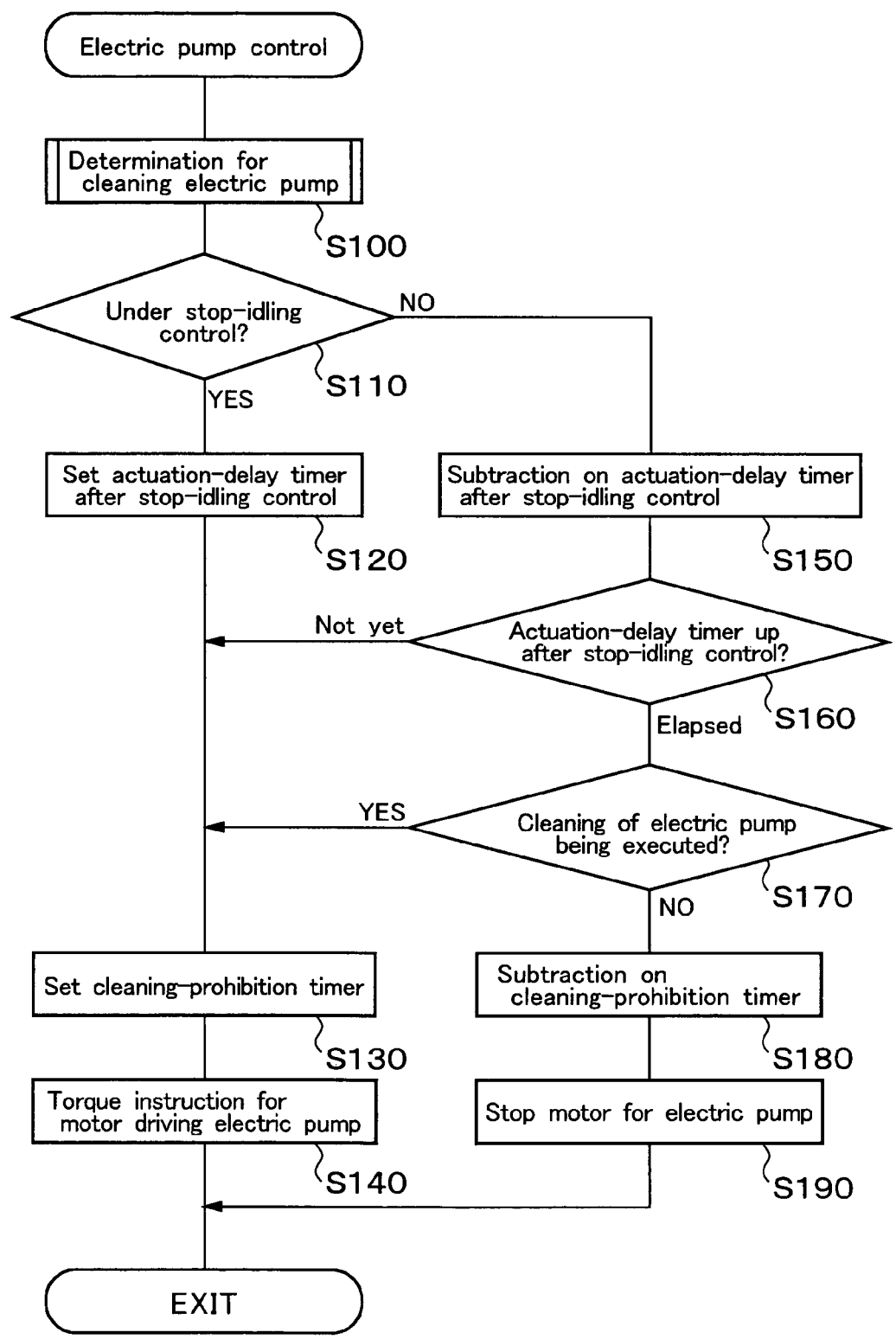
FIG. 4 is a flow chart describing how the electrical oil pump is controlled by a control unit.
Figure 5:
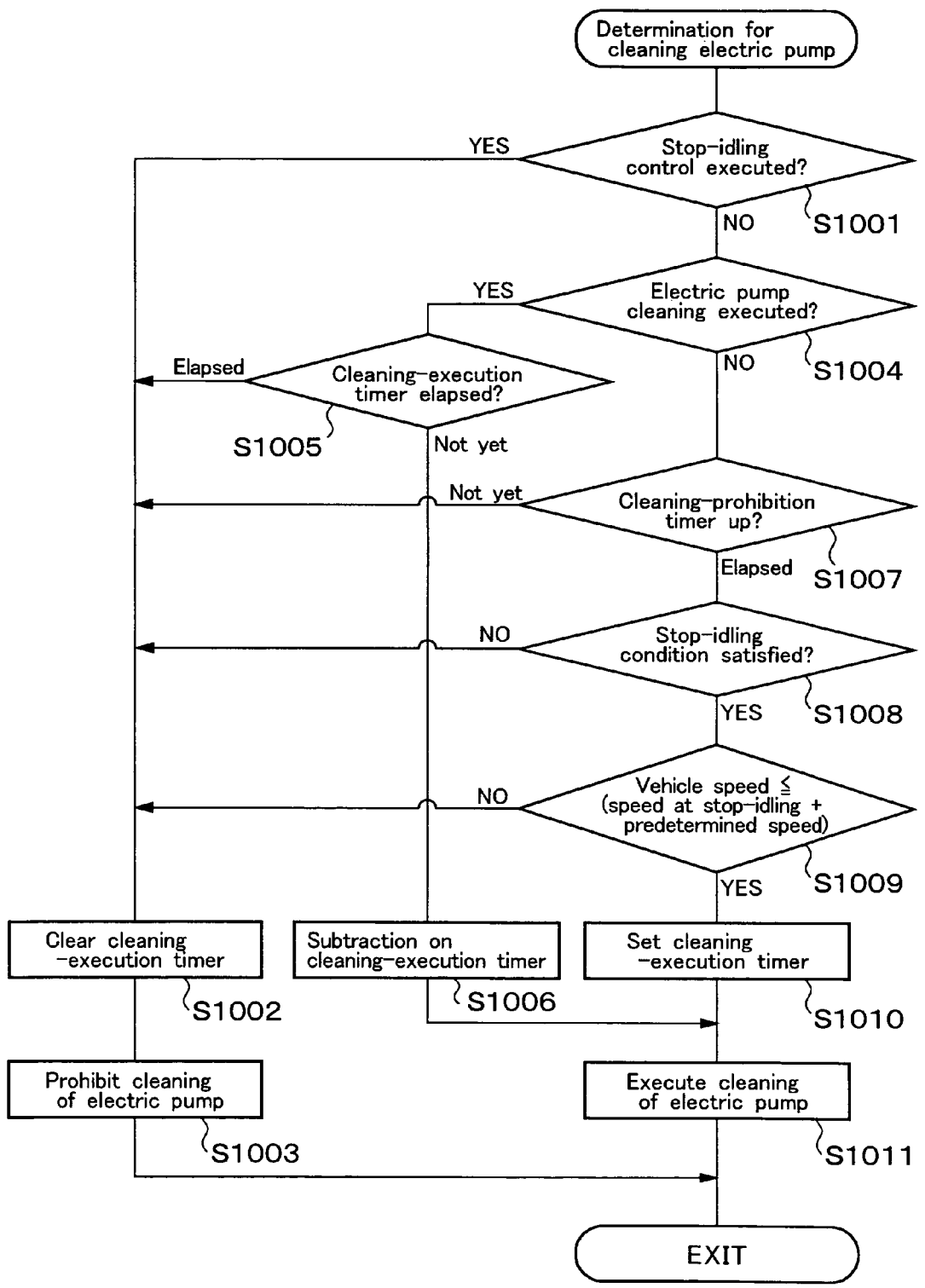
FIG. 5 is a flow chart showing the steps of a control for executing a cleaning operation.

Now, the specific operation of the idling-elimination control program, which is installed on the control unit 15, is detailed in reference to FIG. 4 and FIG. 5. The control unit 15, when it has come into a mode for controlling the electrical oil pump 21, at first, makes a determination for a cleaning operation (cleaning control determination S100). In this operation, at first, a determination is made at S1001 whether or not the stop-idling control is being executed currently. If the result of the determination is that the stop-idling control is under way, then a cleaning-execution timer is cleared at S1002, the operation of the electrical oil pump 21 is terminated to stop the cleaning operation at S1003, and this turn of the cleaning control determination S100 ends. The cleaning-execution timer is a timer for counting the period of time during which the control unit 15 makes the electrical oil pump 21 operate for cleaning.

If the result of the determination at S1001 is that the stop-idling control is not executed currently, then another determination is made at S1004 whether or not the cleaning operation of the electrical oil pump 21 is being executed currently. If the result of the determination is that the cleaning operation is being executed, then yet another determination is made at S1005 whether or not a predetermined time period ($T_0$ in FIG. 3) has elapsed on the cleaning-execution timer. If the time has elapsed, then the cleaning-execution timer is cleared at S1002, the cleaning operation of the electrical oil pump 21 is terminated at S1003, and this turn of the cleaning control determination S100 ends. On the other hand, if the result of the determination at S1005 is that the predetermined time period has not elapsed on the cleaning-execution timer, then the time is counted down on the cleaning-execution timer at S1006, and the cleaning operation of the electrical oil pump 21 is continued at S1011, and this turn of the cleaning control determination S100 ends.

If the result of the determination at S1004 is that the cleaning operation is not being executed, then another determination is made at S1007 whether the predetermined time set on a cleaning-prohibition timer has elapsed or not. The cleaning-prohibition timer is a timer that counts the time that has elapsed since the electrical oil pump 21 last stopped. This timer is a determinant whether the execution of the cleaning operation is prohibited or allowed. If the result of the determination is that the predetermined time has not elapsed on the cleaning-prohibition timer, then the cleaning-execution timer is cleared at S1002, the cleaning operation of the electrical oil pump 21 is terminated at S1003, and this turn of the cleaning control determination S100 ends.

On the other hand, if the result of the determination at S1007 is that the predetermined time has elapsed on the cleaning-prohibition timer, then another determination is made at S1008 whether the stop-idling conditions are satisfied or not. If the result of the determination is that the stop-idling conditions are not satisfied, then the cleaning-execution timer is cleared at S1002, the cleaning operation of the electrical oil pump 21 is terminated at S1003, and this turn of the cleaning control determination S100 ends. On the other hand, if the result is that the stop-idling conditions are satisfied, then another determination is made at S1009 whether the vehicle speed is equal to or lower than vehicle speed $V_1$, at which the cleaning operation is started. If the vehicle speed is higher than the cleaning-starting vehicle speed $V_1$, then the cleaning-execution timer is cleared at S1002, the cleaning operation of the electrical oil pump 21 is terminated at S1003, and this turn of the cleaning control determination S100 ends.

If the result of the determination at S1009 is that the vehicle speed is equal to or lower than the cleaning-starting vehicle speed $V_1$, the cleaning-execution timer is set at time $T_1$ at S1010, the electrical oil pump 21 is brought into operation to execute the cleaning operation at S1011, and this turn of the cleaning control determination S100 ends.

After the cleaning control determination S100 is executed in this way, another determination is made at S110 whether the stop-idling control is under way or not. If the result of the determination is that the stop-idling control is being executed, then a post-stop-idling actuation delay timer is set at S120, the cleaning-prohibition timer is set at S130, and, a torque command value is output to the electrical oil pump 21. Here, the post-stop-idling actuation delay timer is for setting a delay time for the electrical oil pump 21 to be activated into operation.

If the result of the determination at S110 is that the stop-idling control is not being executed, then the time set on the post-stop-idling actuation delay timer is subtracted at S150, and another determination is made at S160 whether the post-stop-idling actuation delay timer has counted up to a predetermined time or not. If the result of the determination is that the post-stop-idling actuation delay timer has not counted up to the predetermined time yet, then the cleaning-prohibition timer is set at S130, and a torque command value is output to the electrical oil pump 21 at S140.

On the other hand, if the result of the determination at S160 is that the post-stop-idling actuation delay timer has just counted up to the predetermined time, then another determination is made at S170 whether or not the cleaning operation is being executed by the electrical oil pump 21. If the result of the determination is that the cleaning operation is being executed, then the cleaning-prohibition timer is set at S130, and a torque command value is output to the electrical oil pump 21 at S140. However, if the result of the determination is that the cleaning operation is not being executed, then the time set on the cleaning-prohibition timer is subtracted at S180, and the electrical oil pump 21 is stopped at S190.

The execution of the cleaning operation by the electrical oil pump 21 is managed by a timer (cleaning-execution timer) of the control program as described above, and the time period during which the electrical oil pump 21 operates for the cleaning operation is relatively short. It is desirable in practice that time $T_0$ for the cleaning operation be within the period of the rotation of the electrical motor 22, which drives the electrical oil pump 21.

By activating and operating the electrical oil pump 21 for a short time (time $T_O$) prior to the real operation of the electrical oil pump 21 for the stop-idling control as described above, air bubbles in the hydraulic circuit are agitated and dispersed. With the hydraulic circuit having no bubbles now, the electrical oil pump 21 can provide a required pressure $P_E$ promptly as shown in FIG. 3D. As a result, the hydraulic pressure by the electrical oil pump 21 never experiences a delay in the rising of the pressure.

In particular, if the hydraulic pressure provided by the electrical oil pump 21 in the cleaning operation is higher than the pressure which can open up the relief valve 40, then hydraulic oil circulates through the recirculation circuit during the cleaning operation, which facilitates the agitation and dispersion of air bubbles.

In this embodiment, the hydraulic pressure at which the relief valve 40 is released is set lower than the pressure at which the hydraulic oil is supplied by the electrical oil pump 21 to the hydraulic control valve 12. By this arrangement, the oil is circulated through the recirculation circuit before the check valve 38 opens to let the oil flow from the electrical oil pump 21 to the hydraulic control valve 12. Therefore, even if air bubbles exist in the hydraulic oil on the side of the electrical oil pump 21 in the hydraulic circuit, i.e., in the third oil passage 35 and the fourth oil passage 36, the bubbles are agitated and dispersed again while the oil is circulating through the recirculation circuit. As a result, by the time when the check valve 38 opens to let the oil flow to the hydraulic control valve 12, the electrical oil pump 21 has been enabled to operate in stable condition.

In addition, the relief valve 40, which is provided on the fifth oil passage 37, is set at a predetermined pressure so that when the fourth oil passage 36 reaches this pressure, it will open and let the oil circulate through the recirculation circuit. This arrangement enables the electrical motor 22 to operate stably at a minimum rotational speed. Otherwise, such a three-phase sensor-less brush-less motor may become unstable if it is operated at a low rotational speed outside its optimal operational range.

In the above described circuit arrangement, while hydraulic oil is being discharged from the electrical oil pump 21, the oil is always circulating through the recirculation circuit. As a result, the ripple of the hydraulic oil discharged from the electrical oil pump 21 is kept relatively small, so the electrical motor 22, which is in sensor-less mode, is controlled stably. Otherwise, the operation of such a sensor-less brush-less motor can become unstable if there is a sudden change in the load which change is beyond the range of allowable fluctuation for optimal operation of the motor.

Furthermore, the relief valve 40, which is provided on the fifth oil passage 37, can act to prevent pressure decrease in a case where the flow of hydraulic oil required to the automatic ratio-change mechanism 7 increases rapidly acting to decrease the hydraulic pressure momentarily, because the relief valve 40 closes and cuts the flow of the hydraulic oil through the recirculation circuit. Moreover, in a case where air bubbles are mixed into the oil, which results in an abnormal drop in the hydraulic pressure, the relief valve 40 closes, blocking the flow through the recirculation circuit. As a result, the air bubbles are discharged or drained to the automatic ratio-change mechanism 7, so the hydraulic circuit can return into normal condition quickly.

The above mentioned cleaning operation is for agitating and dispersing air bubbles, which are generated in the hydraulic circuit when the electrical oil pump 21 is not in operation. Therefore, the control unit 15 does not execute the cleaning operation until a predetermined time elapses after the termination of the operation of the electrical oil pump 21. In other words, after the execution of the stop-idling control, the cleaning operation is not executed for the predetermine time period (counted by the cleaning-prohibition timer) even if the stop-idling control is executed again.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2004-349645 filed on Dec. 2, 2004, which is incorporated herein by reference.

What is claimed is:

1. A hydraulic pressurizer system comprising:
a drive source for driving a vehicle;
a mechanical oil pump, which is driven by said drive source;
an electrical motor, which is activated by a battery;
an electrical oil pump, which is driven by said electrical motor;
a ratio-change mechanism, which is actuated by means of hydraulic oil being supplied from said mechanical oil pump and from said electrical oil pump for establishing a speed change ratio, at which a rotational driving force from said drive source is transmitted to wheels with a rotational speed change; and
a control unit, which activates said electrical motor;
wherein:
said control unit executes a cleaning operation, in which said electrical oil pump is made active for a predetermined period of time that is set less than or equal to a time that the electrical motor takes for a single rotation, before stopping said drive source by executing a control for stopping said drive source.

2. The hydraulic pressurizer system as set forth in claim 1, further comprising:
an oil passage which connects between an outlet side of and an inlet side of said electrical oil pump; and
a relief valve, which is provided on said oil passage and is released to open when the hydraulic pressure of said outlet side becomes equal to or higher than a predetermined value.

3. The hydraulic pressurizer system as set forth in claim 2, wherein:
the hydraulic pressure at which said relief valve is released open is set lower than the hydraulic pressure at which said electrical oil pump supplies hydraulic oil to said ratio-change mechanism.

4. The hydraulic pressurizer system as set forth in claim 1, wherein:
said drive source comprises an engine and a motor generator; and
the driving force from either one of said engine and said motor generator or the driving force from both said engine and said motor generator is transmitted through said ratio-change mechanism to said wheels.

5. The hydraulic pressurizer system as set forth in claim 4, wherein:
said control unit executes said cleaning operation when it executes a stop-idling control, which stops said engine when the rotation of said wheels comes to a standstill.

6. The hydraulic pressurizer system as set forth in claim 1, wherein:

said cleaning operation is realized by a program installed on said control unit; and said predetermined period of time, for which said cleaning operation is executed, is administered by a timer of said program.

7. The hydraulic pressurizer system as set forth in claim 1, wherein:

said electrical motor comprises a three-phase brush-less sensor-less motor.

8. The hydraulic pressurizer system as set forth in claim 1, wherein said electrical oil pump is made inactive after said cleaning operation and said electrical oil pump is made active again during said stopping said drive source by executing the control for stopping said drive source.

* * * * *